UNITED STATES PATENT OFFICE.

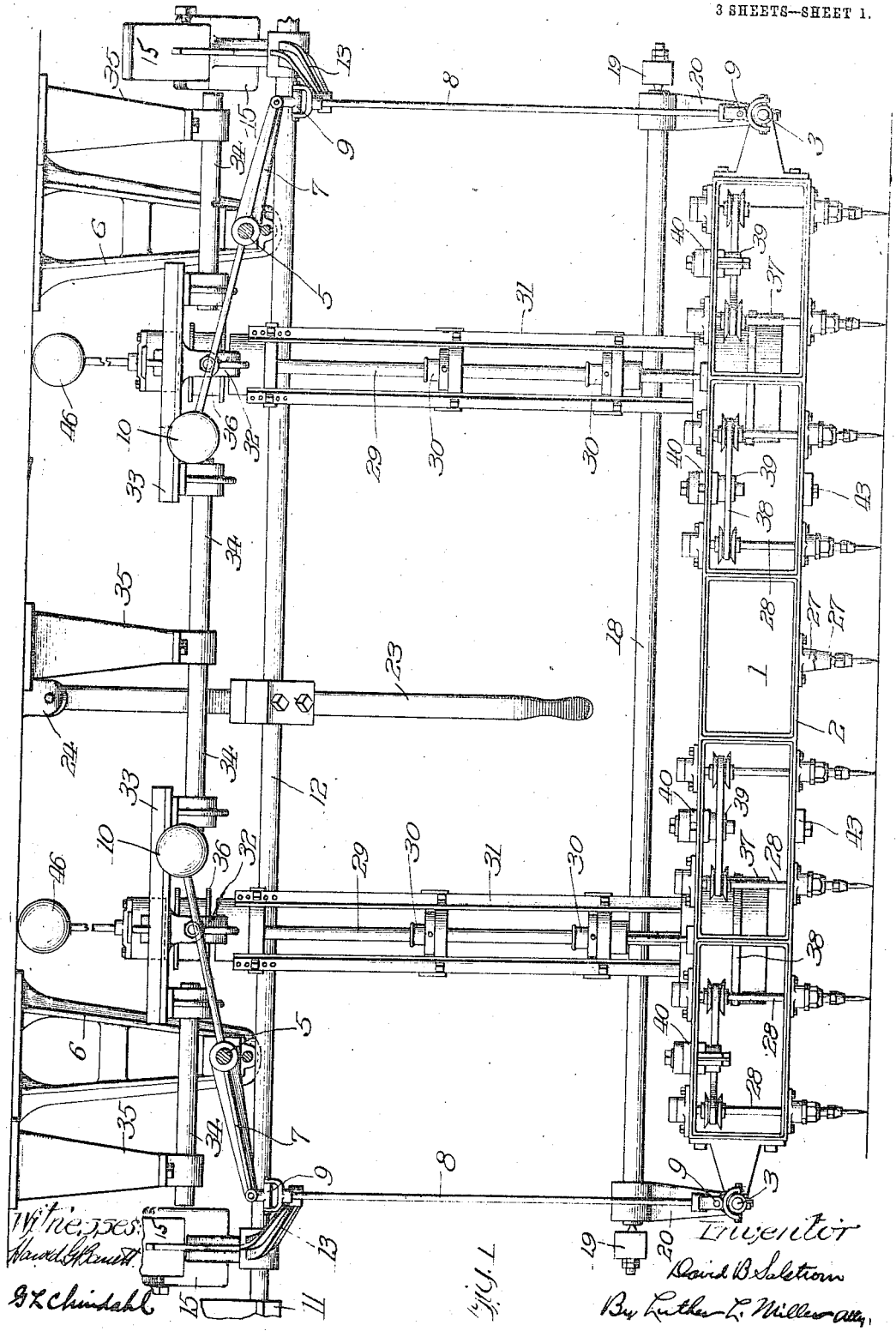

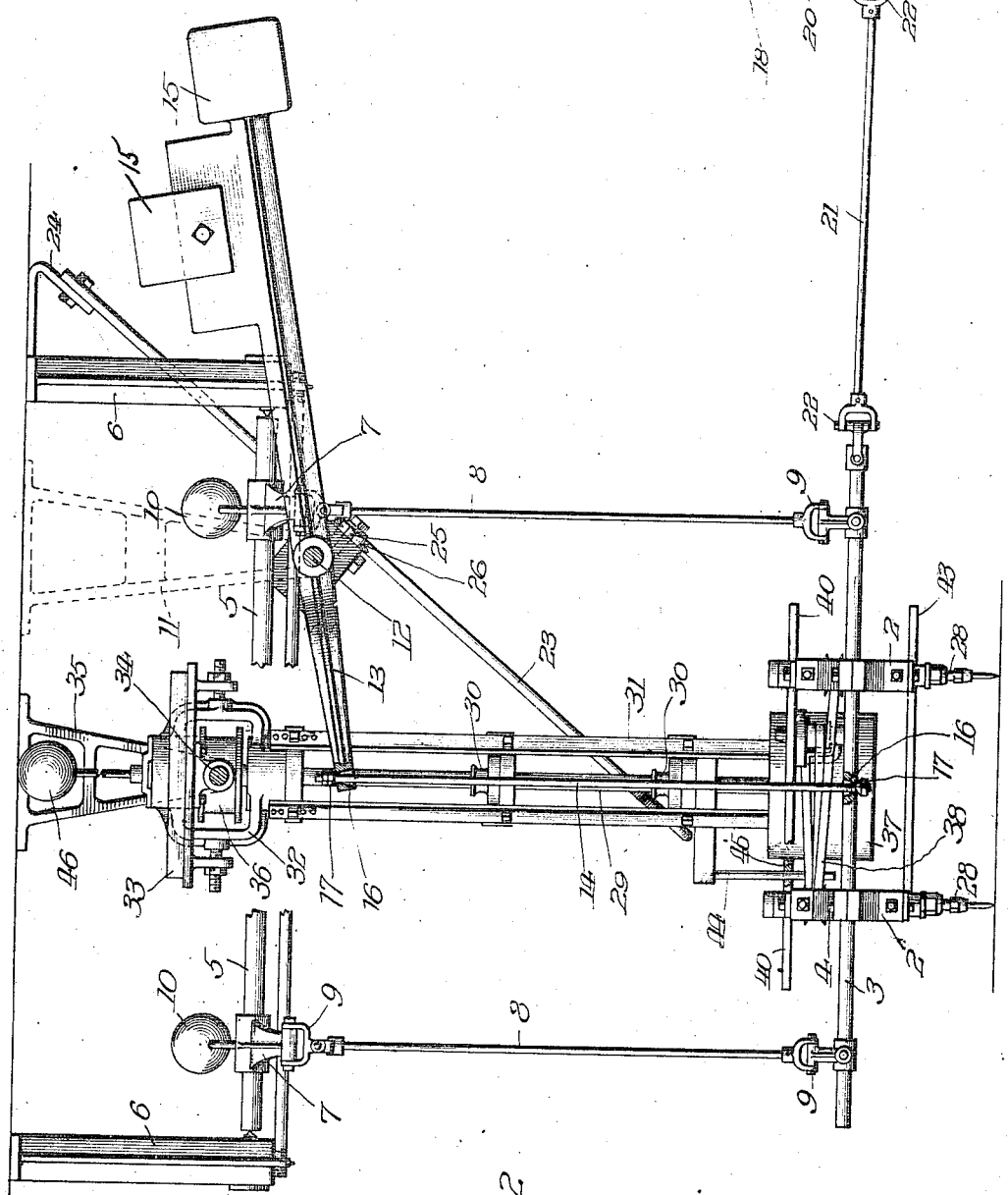

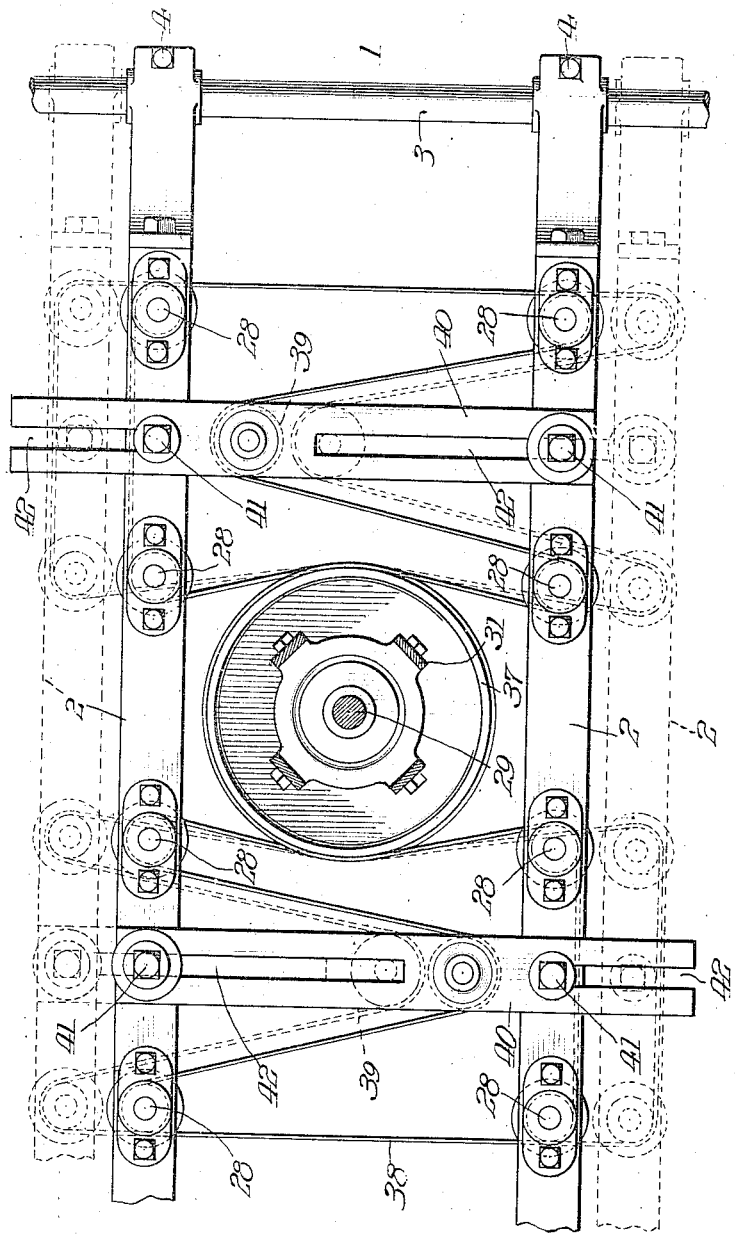

DAVID B. SALSTROM, OF CHICAGO, ILLINOIS, ASSIGNOR OF ONE-HALF TO EMANUEL KOPRIWA, OF CHICAGO, ILLINOIS.

CARVING-MACHINE.

957,717.  Specification of Letters Patent.  Patented May 10, 1910.

Application filed August 19, 1908. Serial No. 449,225.

*To all whom it may concern:*

Be it known that I, DAVID B. SALSTROM, a citizen of the United States, residing at Chicago, in the county of Cook and State of Illinois, have invented certain new and useful Improvements in Carving-Machines, of which the following is a specification.

The object of this invention, generally stated, is to increase the capacity of carving machines of the type comprising a movably-supported head that carries a tracer and a plurality of cutting tools.

In a carving machine it is essential that vibration of the tool-carrying head and the tools be reduced to a minimum, as such vibration renders it impossible to give the work a smooth surface and prevents an accurate reproduction of the pattern at points remote from the latter. For this reason an endeavor to augment the output of a carving machine by merely duplicating the tools and tool-driving apparatus is unavailing, since such duplication of moving parts unavoidably increases vibration to an impracticable extent.

The present invention relates to a form of tool-carrying head, a suspension for said head, and a drive for the tools which permits of the employment of a much larger number of tools than has heretofore been possible, with a consequent increase in the number of pieces that can be operated upon at the same time.

In the accompanying drawings, Figure 1 is a front elevation of a carving machine embodying the features of my invention, the table being omitted. Fig. 2 is an end elevation of the parts shown in Fig. 1. Fig. 3 is a fragmental top plan view of the tool-carrying head.

In the present embodiment of the invention the pieces to be carved are supported upon the table in two parallel rows, and two series of carving tools are carried by a head 1 which is movably suspended above the table. As herein shown, the head 1 consists of two frames 2 connected at their ends by rods 3. A series of tools is supported by each of said frames. When a so-called "center-table" is used to support the work, it is not practicable to mount the pieces of work to suit the location of the cutters; hence it is very desirable to provide means for changing the location of the cutters to correspond with the position of the work, the position of the work varying with the size of the individual pieces. In order, therefore, to permit of changing the width of the head 1 to space the series of tools at variable distances apart and thus adapt the machine to operate upon pieces of various sizes, the frames 2 are adjustably secured to the rods 3 by means of clamping screws 4.

The head 1 is supported to move forward and back, up and down and from side to side by means comprising two rock shafts 5 each supported near one side of the machine by any suitable means such as hangers 6 attached to the ceiling. Two arms 7 fixed upon each of the shafts 5 are connected with the head 1 at opposite sides of the latter by means of links 8, universal joints 9 being employed to connect said links with the head and the arms 7. Attached to the rear ends of the arms 7 are counterweights 10. Mounted in hangers 11 or other suitable supports is a rock shaft 12 to which are fixed two arms 13 each connected at one end with the adjacent end of the head 1 through the medium of a link 14 (Fig. 2). The rear ends of the arms 13 carry counterbalance-weights 15. Most of the weight of the head 1 is supported and counterbalanced by the arms 13. Suitable means should be employed to permit of a certain amount of pivotal movement between the links 14 and the parts to which they are attached. The openings 16 in the rods 3 and the arms 13 may be made flaring, as shown in Fig. 2, and the nuts 17 upon the links 14 may have rounded bearing faces, as indicated.

In order to equalize the back and forth movements of the ends of the head 1, I provide a rock shaft 18 supported in bearings 19, said shaft having two arms 20 fixed thereto, which arms are connected to the opposite ends of the head 1 by means of links 21 (Fig. 2). Universal joints 22 are interposed between said links and the head 1 and the arms 20.

When the head 1 is moved to one side by the operator, gravity tends to return the head to the position shown in Fig. 1. In order to relieve the operator of the strain incident to holding the head against the action of gravity, the supports for the head, or a portion of said supports, may be made shiftable, if desired, in the direction in which the head is moved. I have herein shown a hand lever 23 pivoted upon a suitable support 24 and connected with the shaft 12, which shaft is longitudinally slidable in its bearings 11. The connection between the lever 23 and the shaft 12 may consist of a pin 25 fixed to a block that in turn is fixed to the shaft, said pin lying in an elongated opening 26 in the lever. When the head 1 is to be moved laterally to any considerable distance, say, four or six inches, the shaft 12 may be moved longitudinally in the same direction, thereby placing the principal support for the head directly above the latter in its changed position.

The pattern-engaging means preferably is located centrally of the head 1. In this instance I have illustrated means for supporting two tracers, although it is not essential that two be used.

The tracer-chucks 27 are located centrally of the frames 2 of the head, while the tool-supporting spindles 28 are arranged in two groups of eight each, one group at each side of the tracers. Four of the spindles of each group are mounted in the front frame and the other four in the rear frame.

In order to eliminate the vibration incident to a long drive, it is very desirable that the spindle-rotating means be located near the spindles. Said spindle-rotating means may be of any suitable character; as herein shown, each group of eight spindles is driven by a single means comprising a vertical shaft 29 supported in bearings 30 in a frame 31, the upper end of said frame being rigidly secured to a yoke 32. The latter is pivotally supported in a frame 33 that is fixed upon the sections of a rock shaft 34 carried in hangers 35. The members 32 and 33 constitute universal or gimbal supports for the shafts 29 whereby the lower ends of the latter are permitted to swing freely laterally and back and forth. Upon the upper end of each shaft 29 is a pulley 36 to receive a drive belt (not shown). To the lower end of each shaft 29 is fixed a drum 37. Power is communicated from each drum 37 to the adjacent eight spindles 28 by means of a single belt 38. The drum is located centrally of its group of spindles, the belt passing around the pulleys of the four spindles at one side of the drum, half-way around the drum, to the other four spindles, around said spindles, and half-way around the drum to the first mentioned spindles, as best shown in Fig. 3. For the sake of clearness the spindle-pulleys at the rear side of the head have been omitted from Fig. 1. As indicated in Fig. 2 the pulleys at the front and the rear of the head are arranged at different heights, in order to permit the belt to lap around the drum. Slack may be taken up by means of one or more idlers 39 each mounted on a bar 40 that is adjustably secured to the frames 2 of the head. In this instance the adjustability referred to is obtained by means of bolts 41 (Fig. 3) extending through slots 42 in the bars 40 into the frames 2. The bars 40 are adjustable not merely that slack in the belts 38 may be taken up but so that the head 1 may be varied in width, as hereinbefore explained. Said bars also serve to brace the head 1. Braces 43 adjustably connecting the lower edges of the frames 2 may further be provided, if desired.

Each of the drums 37 is held in proper relation to the tool-carrying head by any suitable means, such as a rod 44 fixed to each swinging frame 31 and passing freely through a perforated lug 45 (Fig. 2) rigidly attached to the head. The connection just described compels the drum 37 to follow the head in the lateral and back and forth movements of the latter, while leaving said head free to move vertically with reference to the drum.

In order to relieve the operator of the weight of the frames 31 and the parts carried thereby when the head is moved sidewise, forward or rearward, counterbalance weights 46 may be attached to the upper end of the tiltable structure 31 32.

In use the pieces to be carved are secured upon the table in two rows directly below the spindles 28, the pattern or patterns being placed below the tracer or tracers. Power being applied to the machine, the operator passes the tracer over the pattern, the cutting tools reproducing said pattern in each of the pieces of work. By reason of the manner herein shown of grouping the spindles, and the proximity of each motor or driver to the spindles driven by it, injurious vibration of the head and the tools is prevented.

I wish it to be understood that I do not desire to be limited to the exact details of construction shown and described, for obvious modifications will occur to a person skilled in the art.

I claim as my invention:

1. A carving machine comprising a head; two rows of spindles in said head; and two driving means located between said rows and each driving the adjacent one-half of the spindles.

2. A carving machine comprising a head; two rows of spindles in said head; a driving means near each end of said head; and a single belt connecting each driving means with a plurality of spindles in both rows.

3. A carving machine comprising sixteen spindles arranged in two groups of eight spindles each; and a single driving means for each group of spindles.

4. A carving machine comprising sixteen spindles and two drivers located relatively near said spindles, each of said drivers having a driving connection with one-half of said spindles.

5. A carving machine comprising sixteen spindles, rotatable driving elements located among said spindles and each driving a plurality of spindles, and means for rotating said elements.

6. A carving machine head having two rows of spindles therein and centrally located pattern-engaging means.

7. A carving machine comprising a support for a tool; and means for supporting said tool-support to swing, said supporting means being shiftable.

8. A carving machine comprising a support for a tool; means for supporting said tool-support to swing; and means for moving said supporting means.

9. A carving machine comprising a head; means for movably supporting said head, said means comprising a shaft movable longitudinally in its bearings and arms on said shaft connected with said head; and means for longitudinally moving said shaft.

10. A carving machine comprising a spindle-driving shaft; and means for suspending said shaft to swing, said suspending means being adapted to be shifted.

11. A carving machine comprising a tool-carrying head suspended to move out from beneath its points of suspension; and means for shifting its points of suspension in the same direction.

12. A carving machine comprising a head; two shafts extending transversely of said head and above its ends; two arms on each of said shafts and connected with said head at opposite sides of the latter; a shaft at one side of said head and extending longitudinally of said head; two arms on the last mentioned shaft connected with the ends of said head; a shaft above said head and extending longitudinally thereof; and two arms on the last mentioned shaft connected with the ends of said head.

13. A carving machine comprising a pair of parallel longitudinal spindle-supporting frames, two transverse rods to which said frames are adjustably secured, and head-supporting means having link connections with said rods at opposite sides of said pair of spindle-supporting frames.

14. A carving machine comprising two parallel longitudinal spindle-supporting frames, two transverse rods to which said frames are adjustably secured, means for suspending said head to move back and forth, a shaft extending substantially parallel with said frames, arms fixed to said shaft, and links connecting said arms with one end of each of said rods for equalizing the back and forth movements of said frames.

15. A carving machine comprising two parallel longitudinal spindle-supporting frames, two transverse rods to which said frames are adjustably secured, a shaft extending substantially parallel with said frames, arms fixed to said shaft, links connecting said arms with said rods at points between said frames, and counterbalance weights acting upon said shaft.

DAVID B. SALSTROM.

Witnesses:
MATILDA M. DALEY,
GEORGE L. CHINDAHL.